US011385338B2

(12) United States Patent
Stanhope (10) Patent No.: US 11,385,338 B2
(45) Date of Patent: Jul. 12, 2022

(54) SYSTEM AND METHOD FOR DISREGARDING OBSCURED SENSOR DATA DURING THE PERFORMANCE OF AN AGRICULTURAL OPERATION

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 300 days.

(21) Appl. No.: 16/294,410

(22) Filed: Mar. 6, 2019

(65) Prior Publication Data
US 2020/0284886 A1   Sep. 10, 2020

(51) Int. Cl.
*G01S 7/497* (2006.01)
*G01S 17/89* (2020.01)
(Continued)

(52) U.S. Cl.
CPC ............ *G01S 7/497* (2013.01); *A01B 79/005* (2013.01); *A01M 7/0057* (2013.01); *G01S 17/89* (2013.01); *G01S 2007/4975* (2013.01)

(58) Field of Classification Search
CPC .. G01S 7/497; G01S 17/89; G01S 2007/4975; A01B 79/005; A01B 69/001; A01M 7/0057
See application file for complete search history.

(56) References Cited

U.S. PATENT DOCUMENTS 5,278,423 A    1/1994  Wangler et al.
6,389,785 B1   5/2002  Diekhans et al.
(Continued)

FOREIGN PATENT DOCUMENTS

WO    WO 2007/036009    4/2007

OTHER PUBLICATIONS

Colaço, André F. et al., "Application of Light Detection and Ranging and Ultrasonic Sensors to High-Throughput Phenotyping and Precision Horticulture: Current Status and Challenges," Nature.com, https://www.nature.com/articles/s41438-018-0043-0, Jul. 1, 2018, 30 pages.
Gil, Emilio et al., "Use of a Terrestrial LIDAR Sensor for Drift Detection in Vineyard Spraying," ProQuest Dialog, https://dialog.proquest.com/professional/docview/1537684419?accountid=157282, https://www.mdpi.com/1424-8220/13/1/516, Jan. 2, 2013, 2 pages.
(Continued)

*Primary Examiner* — Fadey S. Jabr
*Assistant Examiner* — Omar K Morsy
(74) *Attorney, Agent, or Firm* — Rebecca L. Henkel; Rickard K. DeMille (57) ABSTRACT

In one aspect, a system for disregarding obscured sensor data during the performance of an agricultural operation may include a sensor provided in operative association with an agricultural machine. The sensor may, in turn, be configured to capture three-dimensional data associated with a portion of the field within a field of view of the sensor. A controller of the system may be configured to configured to generate an initial three-dimensional representation of the field based on data received from the sensor. Moreover, the controller may be configured to identify an obscured region within the generated initial three-dimensional representation of the field. Additionally, the controller may be configured to disregard a three-dimensional volume associated with the obscured region from the initial three-dimensional representation of the field to form a modified three-dimensional representation of the field.

18 Claims, 5 Drawing Sheets

(51) Int. Cl.
*A01B 79/00* (2006.01)
*A01M 7/00* (2006.01)

(56) References Cited

U.S. PATENT DOCUMENTS

| | | | |
|---|---|---|---|
| 6,862,083 | B1 | 3/2005 | McConnell, Sr. et al. |
| 9,025,144 | B2 | 5/2015 | Knox et al. |
| 9,221,461 | B2 * | 12/2015 | Ferguson ............... B60W 30/12 |
| 9,226,490 | B2 | 1/2016 | Keye |
| 9,274,524 | B2 | 3/2016 | Anderson |
| 9,405,039 | B2 | 8/2016 | Anderson |
| 9,516,802 | B2 | 12/2016 | Zemenchik |
| 9,565,848 | B2 | 2/2017 | Stowe et al. |
| 9,819,925 | B2 | 11/2017 | Posselius et al. |
| 9,824,295 | B2 | 11/2017 | Hiriyannaiah et al. |
| 10,721,859 | B2 * | 7/2020 | Wu ........................... G06T 7/73 |
| 2013/0211659 | A1 * | 8/2013 | Peynot ............... G06K 9/00805 701/28 |
| 2016/0148506 | A1 * | 5/2016 | De Oliveira ..... G08G 1/096758 340/905 |
| 2017/0010619 | A1 | 1/2017 | Foster et al. |
| 2018/0027727 | A1 | 2/2018 | Leeb |

OTHER PUBLICATIONS

Shi, Y. et al., "Improvement of a Ground-LiDAR-Based Corn Plant Population and Spacing Measurement System," ScienceDirect/ ElSevier, vol. 112 pp. 92-101, https://www.sciencedirect.com/science/article/pii/S0168169914003093?via%3Dihub, Mar. 2015, 2 pages.

Zhang, Zhihong et al., "Review of Variable-Rate Sprayer Applications Based on Real-Time Sensor Technologies," Intech Open, http://dx.doi.org/10.5772/intechopen.73622 , Feb. 8, 2018, 28 pages.

* cited by examiner

SYSTEM AND METHOD FOR DISREGARDING OBSCURED SENSOR DATA DURING THE PERFORMANCE OF AN AGRICULTURAL OPERATION

FIELD OF THE INVENTION

The present disclosure generally relates to agricultural machines and, more particularly, to systems and methods for disregarding obscured sensor data (e.g., due dust clouds, spray clouds, and/or the other airborne particulate matter) during the performance of an agricultural operation by an agricultural machine.

BACKGROUND OF THE INVENTION

Agricultural sprayers apply an agricultural substance (e.g., a pesticide, a fungicide, and/or the like) onto crops as the sprayer is traveling across a field. To facilitate such travel, sprayers are configured as self-propelled vehicles or implements towed behind an agricultural tractor or other suitable work vehicle. A typical sprayer includes one or more outwardly-extending booms on which a plurality of spaced apart nozzles is mounted. Each nozzle is configured to dispense or otherwise spray the agricultural substance onto underlying crops and/or weeds.

It is generally desirable that the boom(s) and/or nozzles of the sprayer remain level and/or aligned relative to the underlying crops or soil surface of the field to facilitate efficient and uniform distribution of the dispensed agricultural substance across the field. As such, some sprayers include one or more actuators that adjust the orientation of the boom(s) relative to the crops based on data received from a sensor(s). However, dust clouds, spray clouds, and/or the other airborne particulate matter present within the field(s) of view of the sensor(s) may result in obscured or otherwise low-quality sensor data. Such obscured data may, in turn, provide an inaccurate representation of the profile of the underlying crops, thereby resulting in inaccurate and/or unnecessary adjustments of the boom(s).

Accordingly, an improved system and method for disregarding obscured sensor data during the performance of an agricultural operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for disregarding obscured sensor data during the performance of an agricultural operation. The system may include an agricultural machine configured to perform an agricultural operation on a field across which the agricultural machine is traveling. The system may also include a sensor provided in operative association with the agricultural machine, with the sensor configured to capture three-dimensional data associated with a portion of the field within a field of view of the sensor. Furthermore, the system may include a controller communicatively coupled to the sensor. The controller may be configured to generate an initial three-dimensional representation of the field based on data received from the sensor. Moreover, the controller may be configured to identify an obscured region within the generated initial three-dimensional representation of the field. Additionally, the controller may be configured to disregard a three-dimensional volume associated with the obscured region from the initial three-dimensional representation of the field to form a modified three-dimensional representation of the field.

In another aspect, the present subject matter is directed to a method for disregarding obscured sensor data during the performance of an agricultural operation by an agricultural machine. The method may include generating, with a computing device, an initial three-dimensional representation of the field based on data received from a sensor provided in operative association with the agricultural machine. The sensor may be configured to capture three-dimensional data associated with a portion of the field within a field of view of the sensor. The method may also include identifying, with the computing device, an obscured region within the generated initial three-dimensional representation of the field. Furthermore, the method may include disregarding, with the computing device, a three-dimensional volume associated with the obscured region from the initial three-dimensional representation of the field to form a modified three-dimensional representation of the field. Additionally, the method may include controlling, with the computing device, an operation of one or more components of the agricultural machine based on the modified three-dimensional representation of the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for disregarding obscured sensor data during the performance of an agricultural operation by an agricultural machine. Specifically, in several embodiments, a controller of the disclosed system may be configured to generate an initial three-dimensional representation of a field across which the agricultural machine is traveling based on data received from one or more sensors mounted on the machine. Each sensor may, in turn, be configured to capture three-dimensional data associated with a portion of the field within an associated field of view of the sensor. For example, in one embodiment, the sensor(s) may be configured as a transceiver-based sensor(s) (e.g., a light detection and ranging (LIDAR) sensor(s)), with each sensor configured to emit one or more output signals for reflection off of the crops/plants present within and/or the soil surface of the field of view and detect the reflected output signal(s) as a return signal(s). In such an embodiment, the three-dimensional data received by the controller from each sensor may correspond to a plurality of data points associated with the location(s) and/or profile(s) of an object(s) present within the associated field of view. Based on the received sensor data, the controller may be configured to generate an initial three-dimensional representation of a portion of the field with the field of view(s) of the sensor(s). Such representation of the field may provide an indication of the location and/or profile of the object(s) (e.g., crops rows, soil surface, and/or the like) present within the field of view(s) of the sensor(s).

Furthermore, in several embodiments, the controller may be configured to identify one or more obscured region(s) within the generated initial three-dimensional representation of the field. More specifically, as the agricultural machine travels across the field, it may encounter dust and/or spray clouds. The dust/spray clouds may, in turn, occlude or otherwise obscure a portion(s) of the field of view(s) of the sensor(s). Furthermore, the dust/spray clouds may appear as object(s) within the initial three-dimensional representation of the field. In certain instances, the initial three-dimensional representation of the field may indicate that a component(s) (e.g., a boom(s) of an agricultural sprayer) the agricultural machine is about to contact an object, namely the dust/spray cloud(s). As such, the controller may be configured to analyze the initial three-dimensional representation of the field to identify any obscured region(s) therein, with such obscured region(s) generally being indicative of dust/spray clouds or other airborne particulate matter. For instance, the controller may be configured to identify the obscured region(s) based on the locations of the data points within the initial representation of the field.

In accordance with aspects of the present subject matter, the controller may be configured to disregard the obscured region(s) within the initial three-dimensional representation of the field. Specifically, in several embodiments, the controller may be configured to disregard a three-dimensional volume(s) associated with the obscured region(s) within the initial three-dimensional representation of the field. Such volume(s) may, in turn, include the portions of the initial representation of the field that extend from the obscured sensor(s) through the dust/spray cloud(s) to the field surface. In this regard, the controller may delete, remove, or simply ignore the volume(s) associated with the obscured region(s) to form a modified three-dimensional representation of the field. As such, the modified representation of the field may include a gap(s) or void(s) where the dust/spray cloud(s) are located. In one embodiment, the controller may be configured to use the modified representation of the field for controlling one or operating parameters of the agricultural machine (e.g., the position(s) of a sprayer boom(s)).

Figure 1:
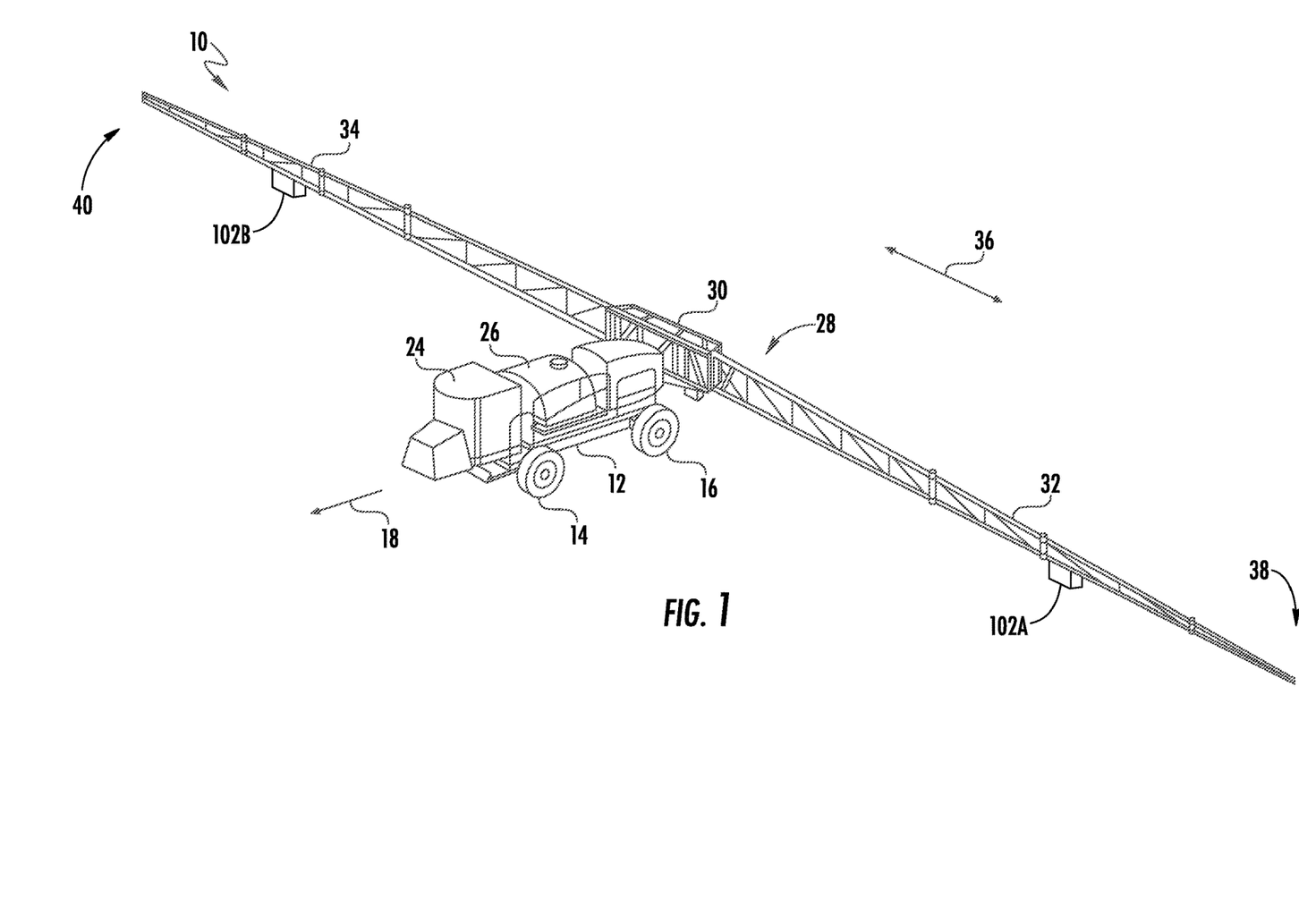
FIG. 1 illustrates a perspective view of one embodiment of an agricultural machine in accordance with aspects of the present subject matter.

Referring now to FIG. 1, a perspective view of one embodiment of an agricultural machine 10 is illustrated in accordance with aspects of the present subject matter. In the illustrated embodiment, the agricultural machine 10 is configured as a self-propelled agricultural sprayer. However, in alternative embodiments, the agricultural machine 10 may be configured as any other suitable type of agricultural vehicle, such as an agricultural tractor, a harvester, and/or the like. Moreover, in further embodiments, the agricultural machine 10 may be configured as a suitable agricultural implement, such as a tillage implement (e.g., a disc harrow, a cultivator, a ripper, and/or the like), a seed-dispensing implement (e.g., a planter, a seeder, and/or the like), a fertilizer-dispensing implement (e.g., a side dresser), a strip tiller, a pull-type sprayer, and/or the like.

As shown, the agricultural machine 10 may include a chassis 12 configured to support or couple to a plurality of components. For example, a pair of steerable front wheels 14 (one is shown) and a pair of driven rear wheels 16 (one is shown) may be coupled to the chassis 12. The wheels 14, 16 may be configured to support the agricultural machine 10 relative to the ground and move the agricultural machine 10 in a direction of travel (e.g., as indicated by arrow 18 in FIG. 1) across a field. In this regard, the agricultural machine 10 may include an engine (not shown) and a transmission (not shown) configured to transmit power from the engine to the wheels 14, 16. Furthermore, the chassis 12 may also support an operator's cab 24 and a tank 26 that is configured to store or hold an agricultural substance, such as a pesticide, a fungicide, a herbicide, a fertilizer, a nutrient, and/or the like.

Additionally, the agricultural machine 10 may include a frame or boom assembly 28 mounted on the frame 12. As shown, in one embodiment, the boom assembly 28 may include a center boom 30 and a pair of wing booms 32, 34 extending outwardly from the center boom 30 in a lateral direction 36, with the lateral direction 36 extending generally perpendicular the direction of travel 18. In this regard, the boom assembly 28 may generally extend in the lateral direction 36 between a first end 38 and an opposed second end 40. As is generally understood, a plurality of nozzles (not shown) mounted on the boom assembly 28 may be configured to dispense the agricultural substance stored in the tank 26 onto the underlying plants (e.g., the crops and/or weeds) and/or soil. However, it should be appreciated that, in alternative embodiments, the boom assembly 28 may include any other suitable number and/or configuration of boom sections, such as more or fewer than three boom sections. Furthermore, it should be appreciated that, in further embodiments, the front wheels 14 of the agricultural machine 10 may be driven in addition to or in lieu of the rear wheels 16.

In accordance with aspects of the present subject matter, the agricultural machine 10 may include one or more sensors coupled thereto and/or mounted thereon. As will be described below, each sensor may be configured to capture three-dimensional data associated with a portion of the field across which the agricultural machine 10 is traveling. Such three-dimensional data may, in turn, be indicative of the location and/or profile of objects within the field, such as crops rows or other plants. As such, in several embodiments, the sensor(s) may be provided in operative association with the agricultural machine 10 such that the associated sensor(s) has a field of view or sensor detection range directed towards a portion(s) of the field adjacent to the machine 10. For example, as shown in FIG. 1, in one embodiment, one sensor 102A may be mounted on the first wing boom 32 to capture three-dimensional data associated with a section of the field disposed underneath and/or in front of the first wing boom 32 relative to the direction of travel 18. Similarly, as shown in FIG. 1, a second sensor 102B may be mounted on the second wing boom 34 to capture three-dimensional data associated with a section of the field disposed underneath and/or in front of the second wing boom 34 relative to the direction of travel 18. However, in alternative embodiments, the sensors 102A, 102B may be installed at any other suitable location(s) on the agricultural machine 10. Additionally, in some embodiments, the agricultural machine 10 may include only one sensor or three or more sensors.

Figure 2:
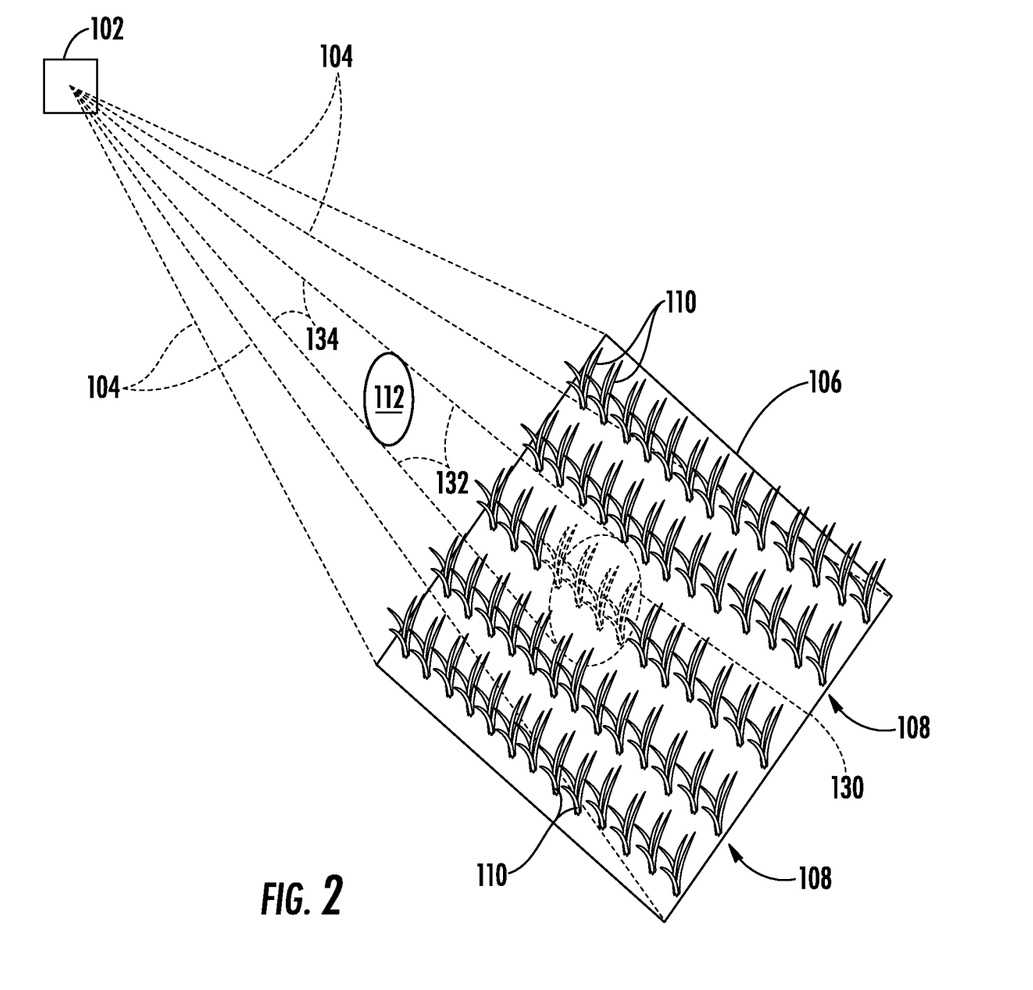
FIG. 2 illustrates a perspective view of one embodiment of a sensor of an agricultural machine and an associated three-dimensional field of view in accordance with aspects of the present subject matter, particularly illustrating an obscured region within the field of view.

Referring now to FIG. 2, a perspective view of one embodiment of a sensor 102 of the agricultural machine 10 is illustrated in accordance with aspects of the present subject matter. In general, the sensor 102 may have a three-dimensional field of view or a sensor detection range (e.g., as indicated by dashed lines 104 in FIG. 2) directed toward a portion of a field 106 across which the agricultural machine 10 is traveling. As shown, the field of view 104 may generally correspond to a three-dimensional volume of space extending between the sensor 102 and the surface of the field 106. In this regard, the sensor 102 may, in turn, be configured to capture three-dimensional data associated with the location and/or profile of objects (e.g., plants, soil, dust/spray clouds, and/or the like) present within the volume of space corresponding to the field of view 104. For example, as shown in FIG. 2, the portion of the field 106 present within the field of view 104 of the sensor 102 includes a plurality of rows 108 of crops 110 (e.g., corn). Additionally, as shown in FIG. 2, a dust/spray cloud 112 is present within the field of view 104. As such, the sensor 102 may capture three-dimensional data associated with the location and/or profile of the crop rows 108 and/or the dust/spray cloud 112 within the field of view 104. Although the field of view 104 of the sensor 102 illustrated in FIG. 2 defines a pentahedron or square pyramid shape, it should be appreciated that the field of view 104 may define any other suitable shape, such as a conical shape.

Figure 3:
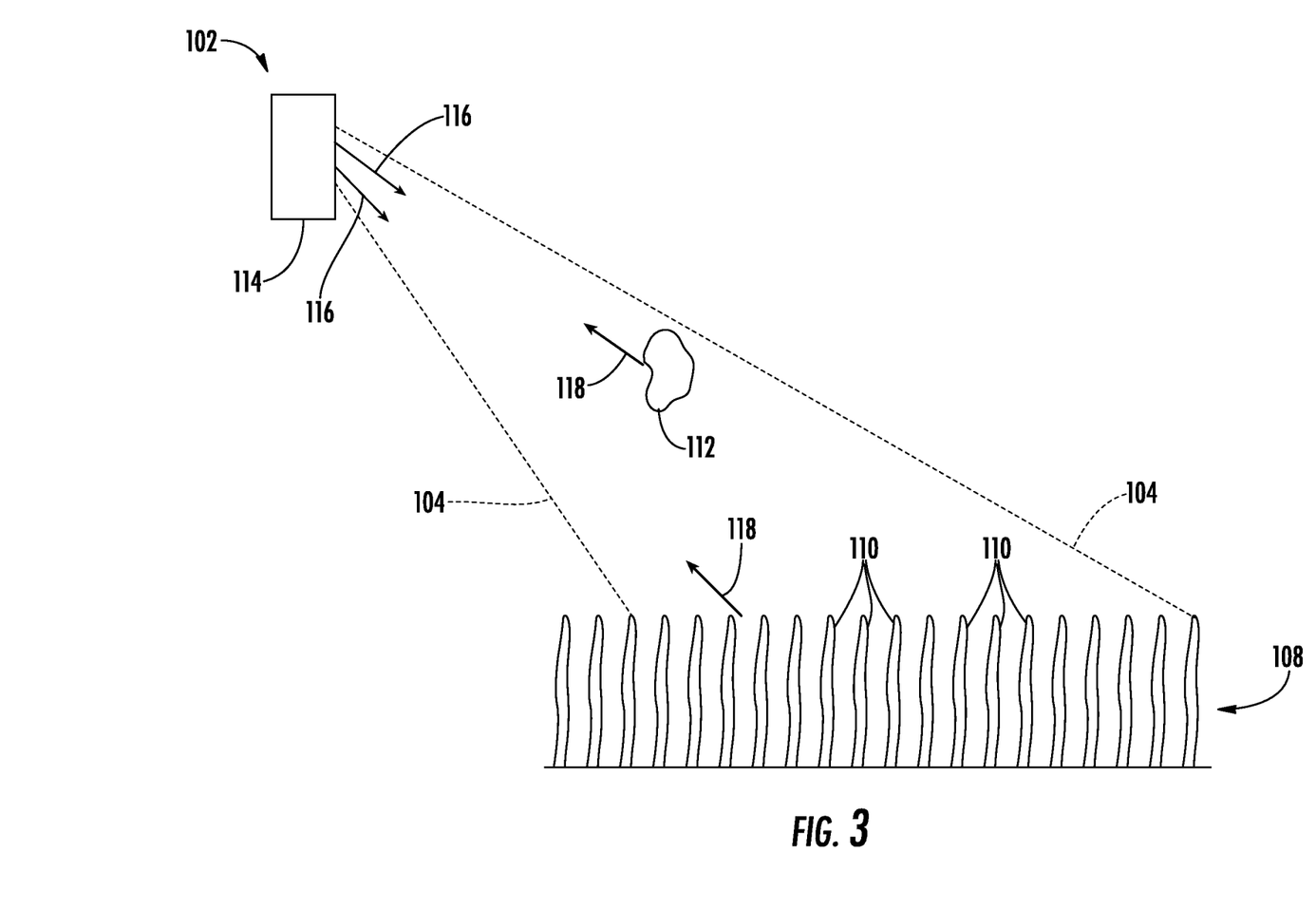
FIG. 3 illustrates a side view of the sensor shown in FIG. 2, particularly illustrating the sensor configured to emit a plurality of output signals for reflection off of the field of view and detect the reflected output signals as return signals.

Referring now to FIG. 3, in several embodiments, the sensor 102 may be configured as a transceiver-based sensor 114. In general, as the agricultural machine 10 travels across the field, the transceiver-based sensor 114 may be configured to emit one or more output signals (e.g., as indicated by arrows 116 in FIG. 3) for reflection off of the plants, soil, and/or other objects within its field of view 104. The output signal(s) 116 may, in turn, be reflected by such objects as return signals (e.g., as indicated by arrows 118 in FIG. 3). Moreover, the transceiver-based sensor 114 may be configured to receive the reflected return signals 118. As will be described below, the received return signal(s) 118 may be indicative of one or more characteristics of the location and/or profile of the objects off which the return signal(s) 118 are reflected.

It should be appreciated that the transceiver-based sensor 114 may generally correspond to any suitable sensing device configured to function as described herein, such as by emitting output signals for reflection off of the objects within it field of view 104 and by receiving or sensing the return signals. For example, in several embodiments, the transceiver-based sensor 110 may correspond to a light detection and ranging (LIDAR) sensor configured to emit light/laser output signals for reflection off of the objects present within its field of view. In such an embodiment, the LIDAR sensor may receive the reflected return signals and generate a plurality of data points based on the received return signal(s), with each data point being indicative of the distance between the sensor and the object off which one of the return signals is reflected. However, in alternative embodiments, the transceiver-based sensor 114 may correspond to a radio detection and ranging (RADAR) sensor, an ultrasonic sensor or any other suitable type of sensor.

In other embodiments, the sensor 102 may be configured as a vision-based sensor. In general, the vision-based sensor may correspond to any suitable sensing device(s) configured to detect or capture image data associated with the field present within the associated field of view. For example, in one embodiment, the vision-based sensor 106 may correspond to a suitable camera(s) configured to capture three-dimensional images of the field being traversed by the agricultural machine 10 and present within the associated field of view. For instance, in a particular embodiment, the vision-based sensor may correspond to a stereographic camera(s) having two or more lenses with a separate image sensor for each lens to allow the camera(s) to capture stereographic or three-dimensional images. However, in alternative embodiments, the vision-based sensor may correspond to an optical sensor(s) or any other suitable vision-based sensing device(s).

It should be further appreciated that the configuration of the agricultural machine 10 described above and shown in FIGS. 1-3 is provided only to place the present subject matter in an exemplary field of use. Thus, it should be appreciated that the present subject matter may be readily adaptable to any manner of machine configuration.

Figure 4:
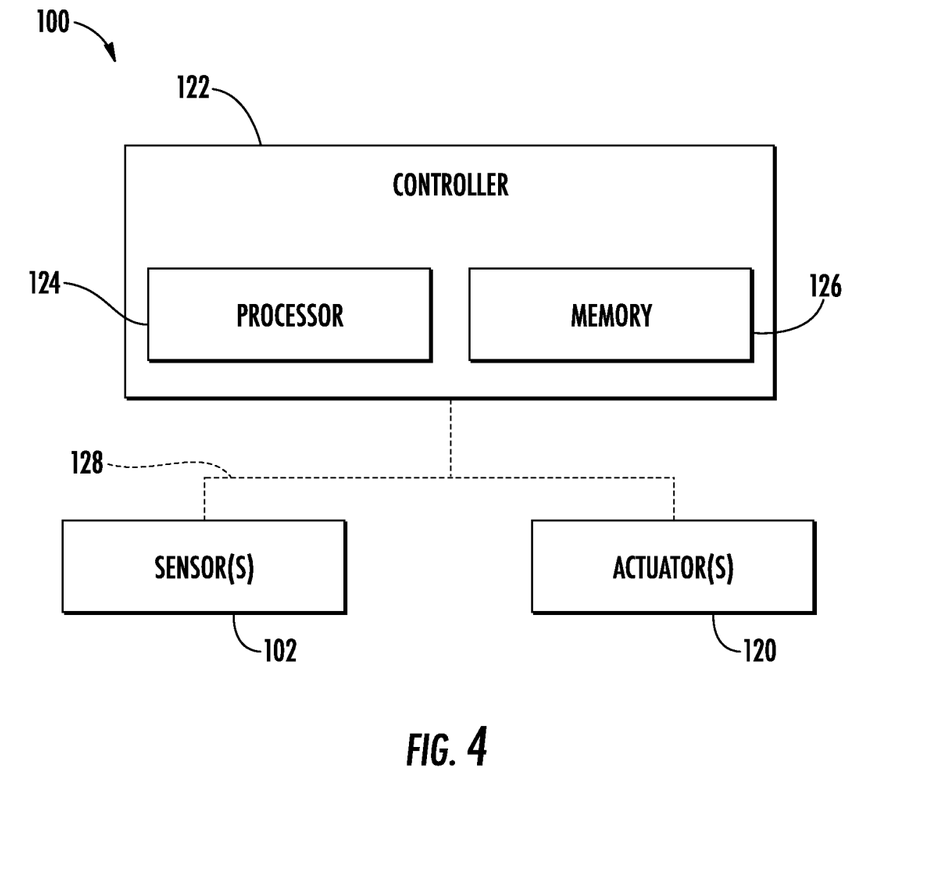
FIG. 4 illustrates a schematic view of one embodiment of a system for disregarding obscured sensor data during the performance of an agricultural operation in accordance with aspects of the present subject matter.

Referring now to FIG. 4, a schematic view of one embodiment of a system 100 for disregarding obscured sensor data during the performance of an agricultural operation is illustrated in accordance with aspects of the present subject matter. In general, the system 100 will be described herein with reference to the agricultural machine 10 described above with reference to FIGS. 1-3. However, it should be appreciated by those of ordinary skill in the art that the disclosed system 100 may generally be utilized with agricultural machines having any other suitable machine configuration.

As shown in FIG. 4, the system 100 may include one or more actuators 120 of the agricultural machine 10 that are configured to adjust the position and/or orientation of the boom assembly 28 relative to the field. Specifically, in several embodiments, the actuator(s) 120 may be configured to adjust the position and/or orientation of the boom assembly 28 relative to the canopy of the underlying crops within the field or the soil surface of the field such that the boom assembly 28 remains level relative to the crop canopy. For example, the actuator(s) 120 may be configured to adjust the position of one or more components of the boom assembly 28 (e.g., the wing booms 32, 34) relative to one or more other components of the boom assembly 28 (e.g., the center boom 30) such that the first and second end 38, 40 of the boom assembly 28 are equidistant from the underlying crop canopy or soil surface. Furthermore, the actuator(s) 120 may be configured to rotate the boom assembly 28 as a whole relative to the chassis 12 of the agricultural machine 10 to maintain a uniform distance between the first and second end 38, 40 of the boom assembly 28 and the crop canopy. Additionally, the actuator(s) 120 may be configured to raise and/or lower the boom assembly 28 as a whole along a vertical direction relative to the chassis 12 in a manner that adjusts the distance between the boom assembly 28 and the crop canopy or soil surface. In one embodiment, the actuator(s) 120 may be configured as a fluid-driven actuator(s), such a hydraulic or pneumatic cylinder(s). However, in alternative embodiments, the actuator(s) 120 may be configured as any other suitable type of actuator(s), such as electric linear actuator(s). For example, in one embodiment, the actuator(s) 120 may correspond to a steering actuator configured to steering of one or more pairs of the wheels 14, 16 in a manner that adjusts the position of the boom assembly 28 relative to features (e.g., crop rows) within the field. Moreover, in another embodiment, the actuator(s) 120 may be configured to adjust the chassis 12 in a manner that adjusts the position of the boom assembly 28 relative to the features within the field.

In accordance with aspects of the present subject matter, the system 100 may include a controller 122 positioned on and/or within or otherwise associated with the agricultural machine 10. In general, the controller 122 may comprise any suitable processor-based device known in the art, such as a computing device or any suitable combination of computing devices. Thus, in several embodiments, the controller 122 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 126 of the controller 122 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 126 may generally be configured to store suitable computer-readable instructions that, when implemented by the processor(s) 124, configure the controller 122 to perform various computer-implemented functions.

In addition, the controller 122 may also include various other suitable components, such as a communications circuit or module, a network interface, one or more input/output channels, a data/control bus and/or the like, to allow controller 122 to be communicatively coupled to any of the various other system components described herein (e.g., the sensor(s) 102 and/or the actuator(s) 120). For instance, as shown in FIG. 4, a communicative link or interface 128 (e.g., a data bus) may be provided between the controller 122 and the components 102, 120 to allow the controller 122 to communicate with such components 102, 120 via any suitable communications protocol (e.g., CANBUS).

It should be appreciated that the controller 122 may correspond to an existing controller(s) of the agricultural machine 10, itself, or the controller 122 may correspond to a separate processing device. For instance, in one embodiment, the controller 122 may form all or part of a separate plug-in module that may be installed in association with the agricultural machine 10 to allow for the disclosed systems to be implemented without requiring additional software to be uploaded onto existing control devices of the agricultural machine 10. It should also be appreciated that the functions of the controller 122 may be performed by a single processor-based device or may be distributed across any number of processor-based devices, in which instance such devices may be considered to form part of the controller 122. For instance, the functions of the controller 108 may be distributed across multiple application-specific controllers, such as an engine controller, a transmission controller, and/or the like.

In several embodiments, the controller 122 may be configured to generate an initial three-dimensional representation of the field across which the agricultural machine 10 is traveling. As described above, the agricultural machine 10 may include one or more sensors 102, with each sensor 102 configured to capture three-dimensional data of a portion of the field within an associated field of view 104. In this regard, as the agricultural machine 10 travels across the field, the controller 122 may be configured to receive the three-dimensional data from the sensor(s) 102 (e.g., via the communicative link 128). Thereafter, the controller 122 may be configured to analyze/process the received data to generate the initial three-dimensional representation of the field. As such, the controller 122 may include a suitable algorithm(s) stored within its memory 126 that, when executed by the processor 124, generates the initial three-dimensional representation of the field from the three-dimensional data received from the sensor(s) 102.

It should be appreciated that, as used herein, the "initial three-dimensional representation of the field" may correspond to any suitable data structure that correlates the received sensor data to various locations within the field. For example, in several embodiments, the initial three-dimensional representation of the field may correspond to a three-dimensional image(s) or spatial model having a three-dimensional arrangement of captured data points. More specifically, as described above, the sensor(s) 102 may be configured as a LIDAR sensor(s) configured to capture a plurality of data points, with each data point being indicative of the location of a portion of an object within the field of view of the corresponding sensor. In such embodiments, the controller 122 may be configured to position each captured data point within a three-dimensional space corresponding to the field(s) of view of the LIDAR sensor(s) to generate the three-dimensional image(s). As such, groups of proximate data points within the generated image(s)/models(s) may illustrate the location(s) and/or profile(s) of the object(s) currently present within the field(s) of view of the LIDAR sensor(s). However, in alternative embodiments, the initial three-dimensional representation of the field may correspond to any other suitable type of data structure, such as data table.

Additionally, it should be appreciated that the generated initial three-dimensional representation of the field may provide an indication of the location and/or profile of the objects (e.g., crops rows) currently present within the field(s) of view 104 of the sensor(s) 102. For example, as shown in FIG. 2, the portion of the field 106 present within the field of view 104 of the sensor 102 includes five rows 108 of crops 112. In such instance, the generated initial three-dimensional representation of the field 106 may provide an indication of the location and/or profile of each of the five crop rows 108 relative to one or more components (e.g., the boom assembly 28) of the agricultural machine 10. However, in alternative embodiments, the initial three-dimensional representation of the field may provide an indication of the location and/or profile of any other suitable object currently present within the field(s) of view 104 of the sensor(s) 102.

In certain instances, dust clouds, spray clouds, and/or other airborne particulate matter may appear as object(s) within the initial three-dimensional representation of the field. More specifically, as the agricultural machine 10 travels across the field, dust/spray clouds may be present within the field(s) of view 104 of the sensor(s) 102. The dust/spray clouds may, in turn, occlude or otherwise obscure the portion(s) of the field(s) of view 104 of the sensor(s) 102 occupied by such clouds. That is, the dust/spray clouds may be located between the sensor(s) 102 and the field (e.g., the crops 110 growing in and the soil surface of the field 106) such that the sensor(s) 102 are unable to capture data associated with the portion of the field behind such clouds. In such instances, the sensor(s) 102 may instead detect the dust/spray clouds as an object(s) within its field(s) of view 104. Furthermore, in one embodiment, the initial three-dimensional representation of the field may not identify the types of objects (e.g., a crop or other plant growing within the field versus a dust/spray cloud) present within the field(s) of view 104 of the sensor(s) 102. Since the dust/spray clouds are typically located between the crops and the sensor(s) 102, the generated initial three-dimensional representation of the field may indicate that a component(s) of the agricultural machine 10 (e.g., the boom assembly 28) is about to contact an object, even though contact alone with such object, namely a dust/spray cloud, generally does not damage the agricultural machine 10. For example, as shown in FIG. 2, a dust/spray cloud 112 is present within the field of view 104 of the sensor 102. The spray cloud 112, in turn, occludes or otherwise obscures the portion (e.g., as indicated by dashed circle 130 in FIG. 2) of the field 106 behind the cloud 112. Furthermore, in such instance, the sensor 102 may detect the dust/spray cloud 112 such that an object corresponding to the location and profile of the cloud 112 appears within the generated initial three-dimensional representation of the field. Since the cloud 112 is positioned much closer to the sensor 102 than the crops 110, the initial three-dimensional representation of the field may indicate that an object may contact a component(s) of the agricultural machine 10 (e.g., the boom assembly 28).

Moreover, the controller 122 may be configured to identify one or more obscured regions within the initial three-dimensional representation of the field. In general, the obscured region(s) may correspond to regions within in the initial three-dimensional representation of the field that are indicative of the presence of dust/spray cloud(s) or other airborne particulate matter. In this regard, as the agricultural machine 10 travels across the field, the controller 122 may be configured to analyze the generated initial three-dimensional representation of the field to identify the presence of any obscured regions therein. For instance, the controller 122 may include a suitable algorithm(s) stored within its memory 126 that, when executed by the processor 124, identifies the obscured region(s) within the generated initial three-dimensional representation of the field.

In several embodiments, the controller 122 may be configured to identify the obscured region(s) based on the location of the data points forming the initial three-dimensional representation of the field. In general, at a given time during the growing season, the crop rows may be expected to have a predetermined range of heights and/or profiles. As such, the data points associated with the crop rows and the soil surface may generally be located at a particular range positions within the initial three-dimensional representation of the field. Conversely, any data points located outside of such range of positions within the initial three-dimensional representation of the field may be assumed to be indicative of or otherwise associated with dust/spray clouds. In this regard, the controller 122 may be configured to compare the position of each data point in initial three-dimensional representation of the field to a predetermined range of positions associated with the presence of crop rows and/or the soil surface of the field. Thereafter, the controller 122 may identify any data point having a location falling outside of the predetermined range as an obscured region.

In certain instances, the overall accuracy of the initial three-dimensional representation of the field may not be adversely affected by a small number of individual obscured data points, particularly when such obscured data points are distributed across the initial representation of the field. That is, a few obscured data points dispersed throughout the initial representation the field may generally be unlikely to appear as an object within the field(s) of view 104 of the sensor(s) 102. However, several obscured data points all located proximate to each other may appear as an object within the initial representation of the field. As such, in one embodiment, the controller 122 may be configured to determine a density of the obscured data points within a plurality of regions of the initial three-dimensional representation of the field. When the determined density exceeds a predetermined density threshold (thereby indicating that obscured data points within the region appear as an object) or fall below a predetermined density threshold (thereby indicating that the obscured data points within the region may be noise), the controller 122 may identify the corresponding region of the initial representation of the field as an obscured region. In one embodiment, such noise may be eliminated or removed by using a high-pass filter.

In alternative embodiments, the controller 122 may be configured to identify the obscured region(s) within the initial three-dimensional representation of the field in any other suitable manner. For example, the controller 122 may be configured to identify the obscured region(s) based on the shape(s) of the object(s) depicted in the initial three-dimensional representation of the field. Specifically, the crops growing within the field and dust/spray clouds may generally have different shapes or profiles. As such, in one embodiment, the controller 122 may perform a classification operation on the data points of the initial three-dimensional representation of the field to extract feature parameters that may be used to identify any objects therein (e.g. using classification methods, such as k-nearest neighbors search, naïve Bayesian classifiers, convoluted neural networks, support vector machines, and/or the like). Thereafter, the controller 122 may compare the values associated with the feature parameter(s) of the identified object(s) to a predetermined range of values associated with dust/spray clouds. When the values of the feature parameter(s) of an identified object falls within the predetermined range of values, the controller 122 may identify the region of the initial three-dimensional representation of the field where such object is present as an obscured region.

In accordance with aspects of the present subject matter, the controller 122 may be configured to disregard the identified obscured region(s) within the initial three-dimensional representation of the field. As indicated above, the obscured region(s) may be indicative of the presence of a dust/spray cloud. Furthermore, such dust/spray cloud may generally be located between the sensor(s) 102 and the field such that the cloud occludes or otherwise obscures a portion of the field. In this regard, there may be a three-dimensional volume within the initial three-dimensional representation of the field that is associated with each obscured region. The three-dimensional volume may, in turn, extend from the corresponding sensor 102 through the obscured region (e.g., the dust/spray cloud) to the surface of the field. As such, the controller 122 may be configured to delete, remove, ignore, or otherwise disregard the data contained with any three-dimensional volume within the initial representation of the field that is associated with an obscured region. By disregarding such data, the controller 122 may be configured to form a modified three-dimensional representation of the field.

For example, as shown in FIG. 2, a dust cloud 112 is present within the field of view 104 of the sensor 102. The dust cloud 112, in turn, occludes or otherwise obscures the portion 130 of the field 106 and a first three-dimensional volume of space (e.g., as indicated by dashed lines 132 in FIG. 2) within the field of view 104 extending from the cloud 112 to the portion 130 of the field 106. Moreover, as shown, a second three-dimensional volume of space (e.g., as indicated by dashed lines 134 in FIG. 2) within the field of view 104 extends from the sensor 102 to the cloud 112. As such, the three-dimensional volume of space associated with the cloud 112 may correspond to the first and second volumes of space 132, 134 as well as the volume of space occupied by the cloud 112. In such instance, the controller 122 may be configured to disregard the data within the initial three-dimensional representation of the field 106 that corresponds to the locations of the first and second volumes of space 132, 134 as well as the volume of space occupied by the cloud 112. By disregarding such data, the controller 122 may be configured to form a modified three-dimensional representation of the field 106.

It should be appreciated that the modified three-dimensional representation of the field may generally include all data present within the initial representation of the field except for the data present within the volume(s) of space associated with the obscured region(s). As such, the modified representation of the field may include a gap(s) or void(s) associated with the presence of a dust/spray cloud(s), with such gap(s) or void(s) extending from the location of the corresponding sensor 102 through the cloud(s) to the surface of the field. In this regard, by disregarding the data contained with any three-dimensional volume of the initial representation of the field that is associated with an obscured region, the modified three-dimensional representation of the field is devoid of any objects that are associated with the presence of dust/spray clouds or other airborne particulate matter.

In several embodiments, the controller 122 may be configured to control the operation of one or more components of the agricultural machine 10 based on the modified three-dimensional representation of the field. Since the modified three-dimensional representation of the field is devoid of any objects that are associated with the presence of dust/spray clouds, all objects present within the modified representation of the field may be assumed to be associated with the plants growing within the field and/or the soil surface of the field. In this regard, the controller 122 may control the operation of the component(s) of the agricultural machine 10 such that the component(s) or positioned at the desired location(s) relative to the crop/plants growing in the field based the object(s) present within the modified representation of the field. As such, the controller 122 may assume that the gap(s)/void(s) within the modified representation of the field are dust/spray clouds or otherwise devoid of crop/plants or other objects that may necessitate the adjustment of the component(s) of the agricultural machine 10.

In one embodiment, the controller 122 may be configured to automatically adjust the position of the boom assembly 28 based on the modified three-dimensional representation of the field. As mentioned above, it may be assumed that all objects present within the modified representation of the field correspond to crop/plants and/or the surface of the field. Specifically, in such an embodiment, the controller 122 may identify crop rows within the modified representation of the field, such as based on the location and/or the profile of the objects within the modified representation of the field. Thereafter, the controller 122 may be configured transmit instructions to the actuator(s) 120 (e.g., via the communicative link 128) instructing the actuator(s) 120 to adjust the orientation of the boom assembly 28 relative to the field (e.g., the canopy of the crops or the soil surface of the field) such that the boom assembly 28 is remains level relative to the field (i.e., the first and second sides 38, 40 of the boom assembly 28 are equally distant from the crop canopy or the soil surface). However, in alternative embodiments, the controller 122 may be configured to control any other suitable operational parameters of the agricultural machine 10 based on the modified three-dimensional representation of the field.

Furthermore, the data associated with the obscured region(s) within the initial three-dimensional representation of the field may be used to control the operation of one or more other components of the agricultural machine 10. More specifically, the data associated with the obscured region(s) may be used as an input for another controller of the agricultural machine 10. For example, in one embodiment, a spray nozzle controller (not shown) may receive the data associated with the obscured region(s) and use such data when detecting blockages in the nozzles or associated fluid conduits. In such an embodiment, the spray nozzle controller may determine that the nozzles and associated conduits adjacent to an obscured region are not blocked. However, it should be appreciated that the data associated with the obscured region(s) may be used to control any other suitable component(s) of the agricultural machine 10. Moreover, it should be appreciated that the data associated with the obscured region(s) may be associated with the initial three-dimension representation of the field (e.g., the obscured regions in such representation) or the modified three-dimensional representation (e.g., the holes or gaps in such representation).

Figure 5:
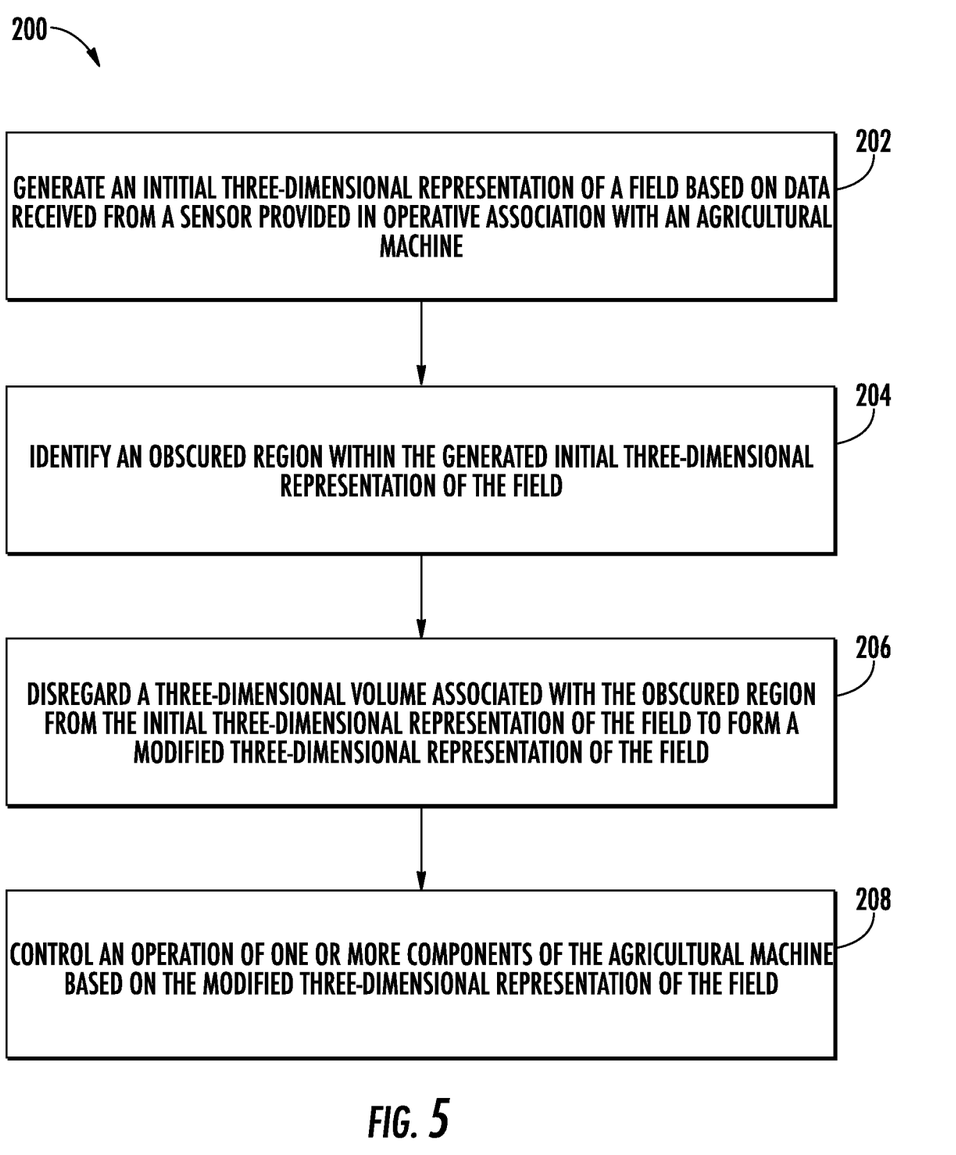
FIG. 5 illustrates a flow diagram of one embodiment of a method for disregarding obscured sensor data during the performance of an agricultural operation in accordance with aspects of the present subject matter.

Referring now to FIG. 5, a flow diagram of one embodiment of a method 200 for disregarding obscured sensor data during the performance of an agricultural operation is illustrated in accordance with aspects of the present subject matter. In general, the method 200 will be described herein with reference to the agricultural machine 10 and the system 100 described above with reference to FIGS. 1-4. However, it should be appreciated by those of ordinary skill in the art that the disclosed method 200 may generally be implemented with any agricultural machine having any suitable machine configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202) the method 200 may include generating, with a computing device, an initial three-dimensional representation of a field based on data received from a sensor provided in operative association with an agricultural machine. For instance, as described above, the controller 122 may be configured to generate an initial three-dimensional representation of the field based on data received from one or more sensors 102 mounted on or otherwise provided in operative association with an agricultural machine 10.

Additionally, at (204), the method 200 may include identifying, with the computing device, an obscured region within the generated initial three-dimensional representation of the field. For instance, as described above, the controller 122 may be configured to identify an obscured region within the generated initial three-dimensional representation of the field.

Moreover, as shown in FIG. 5, at (206), the method 200 may include disregarding, with the computing device, a three-dimensional volume associated with the obscured region from the initial three-dimensional representation of the field to form a modified three-dimensional representation of the field. For instance, as described above, the controller 122 may be configured to disregard a three-dimensional volume associated with the obscured region from the initial three-dimensional representation of the field to form a modified three-dimensional representation of the field.

Furthermore, at (208), the method 200 may include controlling, with the computing device, an operation of one or more components of the agricultural machine based on the modified three-dimensional representation of the field. For instance, as described above, the controller 122 may be configured to control the operation of one or more components of the agricultural machine based on the modified three-dimensional representation of the field. In one embodiment, the controller 122 may be configured to control the operation of the actuator(s) 120 in a manner that adjust the position and/or orientation of the boom assembly 28 relative to the underlying crops within or the soil surface of the field.

It is to be understood that the steps of the method 200 are performed by the controller 122 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 122 described herein, such as the method 200 is implemented in software code or instructions which are tangibly stored on a tangible computer readable medium. The controller 122 loads the software code or instructions via a direct interface with the computer readable medium or via a wired and/or wireless network. Upon loading and executing such software code or instructions by the controller 122, the controller 122 may perform any of the functionality of the controller 122 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for disregarding obscured sensor data during the performance of an agricultural operation, the system comprising:
    an agricultural machine configured to perform an agricultural operation on a field across which the agricultural machine is traveling;
    a sensor provided in operative association with the agricultural machine, the sensor configured to capture three-dimensional data associated with a portion of the field within a field of view of the sensor; and
    a controller communicatively coupled to the sensor, the controller configured to:
        generate an initial three-dimensional representation of the field based on data received from the sensor;
        identify an Obscured region within the generated initial three-dimensional representation of the field;
        disregard a three-dimensional volume associated with the obscured region from the initial three-dimensional representation of the field such that an unobscured region of the initial three-dimensional representation remains; and
        control an operation of one or more components of the agricultural machine based on the unobscured region of the initial three-dimensional representation of the field.

2. The system of claim 1, wherein the sensor is configured to emit an output signal for reflection off of at least one of plants or soil present within the field of view and detect the reflected output signal as a return signal.

3. The system of claim 2, wherein the sensor comprises a LIDAR sensor.

4. The system of claim 1, wherein initial three-dimensional representation of the field comprises a plurality of data points, the controller further configured to identify the obscured region based on a location of each data point of the plurality of data points.

5. The system of claim 1, wherein the controller is configured to perform a classification operation on the generated initial three-dimensional representation of the field to identify the obscured region.

6. The system of claim 1, wherein the controller is configured to:
    identify a plurality of crops rows within the unobscured region of the initial three-dimensional representation of the field; and
    control an operation of one or more components of the agricultural machine based on the identified crop rows.

7. The system of claim 1, wherein the agricultural machine corresponds to an agricultural sprayer, the controller further configured to control a position of a boom of the agricultural sprayer based on the unobscured region of the initial three-dimensional representation of the field.

8. The system of claim 1, wherein the obscured region is associated with at least one of a spray cloud or a dust cloud.

9. The system of claim 1, wherein the sensor comprises a vision-based sensor.

10. A method for disregarding obscured sensor data during the performance of an agricultural operation by an agricultural machine, the method comprising:
- generating, with a computing device, an initial three-dimensional representation of the field based on data received from a sensor provided in operative association with the agricultural machine, the sensor configured to capture three-dimensional data associated with a portion of the field within a field of view of the sensor;
- identifying, with the computing device, an obscured region within the generated initial three-dimensional representation of the field; and
- disregarding, with the computing device, a three-dimensional volume associated with the obscured region from the initial three-dimensional representation of the field such that an unobscured region of the initial three-dimensional representation remains; and
- controlling, with the computing device, an operation of one or more components of the agricultural machine based on the unobscured region of the initial three-dimensional representation of the field.

11. The method of claim 10, wherein the sensor is configured to emit an output signal for reflection off of at least one of plants or soil present within the field of view and detect the reflected output signal as a return signal.

12. The method of claim 11, wherein the sensor comprises a LIDAR sensor.

13. The method of claim 10, wherein the initial three-dimensional representation of the field comprises a plurality of data points, the method further comprising:
- identifying, with the computing device, the obscured region based on a location of each data point within the plurality of data points.

14. The method of claim 10, further comprising:
- performing, with the computing device, a classification operation on the generated initial three-dimensional representation of the field to identify the obscured region.

15. The method of claim 10, further comprising:
- identifying, with the computing device, a plurality of crops rows within the unobscured region of the initial three-dimensional representation of the field; and
- controlling, with the computing device, the operation of the one or more components of the agricultural machine based on the identified crop rows.

16. The method of claim 10, wherein the agricultural machine corresponds to an agricultural sprayer, the method further comprising:
- controlling, with the computing device, a position of a boom of the agricultural sprayer based on the unobscured region of the initial three-dimensional representation of the field.

17. The method of claim 10, wherein the obscured region is associated with at least one of a spray cloud or a dust cloud.

18. The method of claim 10, wherein the sensor comprises a vision-based sensor.

* * * * *